United States Patent [19]

Bouton et al.

[11] 3,970,607

[45] July 20, 1976

[54] CONTROLLED HIGH TEMPERATURE POLYMERIZATION OF BUTADIENE

[75] Inventors: Thomas C. Bouton, Akron; Shingo Futamura, Munroe Falls, both of Ohio

[73] Assignee: The Firestone Tire & Rubber Company, Akron, Ohio

[22] Filed: July 29, 1974

[21] Appl. No.: 492,573

Related U.S. Application Data

[63] Continuation of Ser. No. 308,062, Nov. 20, 1972, abandoned, which is a continuation-in-part of Ser. No. 132,189, April 7, 1971, abandoned.

[52] U.S. Cl.................................. 526/335; 526/88; 526/174
[51] Int. Cl.$^2$...................................... C08F 136/04
[58] Field of Search.......... 260/83.7, 85.3 R, 94.2 M

[56] References Cited
UNITED STATES PATENTS

| | | | |
|---|---|---|---|
| 2,559,947 | 7/1951 | Crouch............................ | 260/94.2 M |
| 3,554,997 | 1/1971 | Bates.................................. | 260/83.7 |
| 3,558,575 | 1/1971 | Keckler............................. | 260/83.7 |
| 3,681,304 | 8/1972 | Johnson........................ | 260/94.2 M |
| 3,801,555 | 4/1972 | Johnson........................ | 260/94.2 M |

FOREIGN PATENTS OR APPLICATIONS

1,197,227   7/1970   United Kingdom

*Primary Examiner*—Paul R. Michl

[57] ABSTRACT

Inclusion of 200 – 3000 parts per million of a 1,2-diene in bulk polymerization or copolymerization of 1,3-butadiene with lithium-based catalysts enables the reaction to be carried out in large-size equipment without loss of temperature control.

8 Claims, No Drawings

CONTROLLED HIGH TEMPERATURE POLYMERIZATION OF BUTADIENE

RELATED APPLICATIONS

This application is a continuation of our abandoned application Ser. No. 308,062 filed Nov. 20, 1972, which in turn is a continuation-in-part of our abandoned application Ser. No. 132,189 filed Apr. 7, 1971.

BACKGROUND OF THE INVENTION

1. Field of the Invention

This invention relates to the control of temperature in the high temperature polymerization and copolymerization of 1,3-butadiene in the substantial absence of diluents, using lithium-based catalysts.

DESCRIPTION OF THE PRIOR ART

It has been disclosed in British patent No. 1,143,690 that the polymerization of 1,3-butadiene at elevated temperatures on the order of 90° – 235°C. results in polymers having a controlled degree of branching which imparts to the polymers a highly desirable improvement in processability, tensile strength and tear resistance in the unvulcanized state, and also freedom from cold flow in the unvulcanized state. In such operations on any sizeable scale, it has generally been found necessary to conduct the polymerization in the presence of a hydrocarbon diluent in order to control the temperature; in the absence of such diluents the polymerization mass becomes highly viscous and provides very poor heat transfer, so that any excursion of the temperature rapidly builds up into a runaway reaction, with consequent danger of explosion and/or degradation of the product. The inclusion of hydrocarbon diluents in the polymerization mass enables the reaction to be controlled, but this of course is wasteful of reactor space and entails the necessity of removing the diluent at the end of the reaction. When it is realized that three or more volumes of diluent per volume of butadiene must be used for this purpose; that all of this diluent must be purified to a degree of purity which will not upset the polymerization; that heat must be supplied for the evaporation of the diluent; and that it is difficult to remove the last traces of diluent from the polymer; it will be appreciated that the disadvantages attending the use of diluents are considerable. Also in British patent No. 1,197,227, 1,3-butadiene is polymerized in the presence of 1,2-butadiene at temperatures which are deliberately elevated into the range of 212° – 400°F. (100° – 204°C.). Although this patent (page 2, line 49) suggests that the reaction may be carried out in bulk, the actual experimental work was conducted in solvent systems, and there is no suggestion that the reaction could be conducted in bulk in large-scale apparatus without loss of temperature control.

Accordingly it is an object of this invention to provide an improved process for the lithium-catalyzed polymerization of butadiene. Another object is to provide such a process which may be carried out at high temperatures with resultant improved cold-flow, tensile strength and tear resistance. A further object is to provide such a process which may be carried out in the substantial absence of hydrocarbon diluents without loss of temperature control and without runaway reaction.

SUMMARY OF THE INVENTION

Synopsis of the Invention

The above and other objects are secured, in accordance with this invention, in a process in which 1,3-butadiene, or a mixture thereof with one or more compounds copolymerizable therewith, is polymerized in the substantial absence of solvents, by means of a hydrocarbon lithium catalyst in a large-scale reactor, e.g., one having a capacity in excess of 15 gallons (68 liters), the polymerization mass containing 200 – 3000 parts per million parts of 1,3-butadiene, of a 1,2-diene of the formula

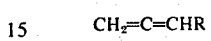

wherein R represents hydrogen or an alkyl group containing 1–3 carbon atoms. Suitable 1,2-dienes are exemplified in propadiene; (the preferred) 1,2-butadiene; 1,2-pentadiene; 1,2-hexadiene; and 4-methyl-1,2-pentadiene. The reaction is carried out initially at temperatures at relatively moderate levels such as 80° – 150°F. (27° – 66°C.). As the reaction progresses, the viscosity of the reaction mass increases, and at a certain point it becomes impossible to keep the temperature at these lower levels, due to the consequent difficulty of removing vapor and heat. However, in contrast to reactions conducted without the presence of the 1,2-diene, the temperature surge in the practice of this invention is self-limiting, and does not rise above about 400°F. (204°C.) and usually does not rise above about 250°F. (121°C.). The presence of the 1,2-diene has been found, in accordance with this invention, to slow down the polymerization reaction whenever the temperature rises unduly, so that the rate of heat evolution does not exceed the practical capabilities of conventional equipment to remove the heat, and the reaction is self-limiting and can be prevented from running away. In the absence of the 1,2-diene, the rate of reaction increases very rapidly with increases in temperature, say to temperatures where degradation of polymer sets in as evidenced by evolution of smoke from the reaction mixture, so that it is impossible to remove the heat of reaction rapidly enough in reaction equipment of any considerable size (say 15 gallons (68 liters) or greater) to prevent an exponential increase in temperature and reaction rate, and consequent runaway reaction. The inclusion of the 1,2-diene in the reaction mass does not impair the properties of the resultant polymers, which are characterized in the unvulcanized state by freedom from cold flow, good processing, good tensile strength and resistance to tear.

The Composition of the Polymerization Reaction Charge

As noted above, the polymerization reaction charge essentially comprises 1,3-butadiene or a mixture thereof with up to 40% of other ethylenically unsaturated compounds copolymerizable therewith, together with from 200 to 3000 parts by weight of a 1,2-diene per million parts by weight of 1,3-butadiene. Preferably the amount of 1,2-diene will be 500 to 2000 parts by weight per million parts by weight of 1,3-butadiene. The composition may also include minor proportions of other extraneous materials soluble in the 1,3-butadiene, provided that they are of such character as not to interfere with the polymerization reaction and are in amounts sufficiently small, (say not over 10%, based on the weight of 1,3-butadiene) that the reaction is essentially a bulk polymerization, i.e., a polymerization in the substantial absence of solvents. Examples of such other extraneous materials which may be present in such minor amounts are essentially inert hydrocarbons such as propene, n-butane, 1-butene, hexane, etc. Also there may be present other compounds capable of controlling the polymerization reaction. For instance, it has been observed by the present patentees that secondary butyl chloride has much the same effect as a 1,2-diene when used in the same quantities as the 1,2-diene; and the weight of 1,2-diene used in the practice of this invention may be reduced by amounts roughly equal to the weight of secondary butyl chloride present.

It will also be appreciated that there may be present in the reaction mass any of various ethylenically unsaturated compounds which are copolymerizable with the butadiene and which do not interfere with the lithium catalyst, such as styrene, alpha-alkyl styrenes such as alpha-methyl styrene, ring-alkylated styrenes such as 1-, 2- and 3-methyl and ethyl styrenes, other conjugated diolefins such as isoprene, 2,3-dimethyl-1,3-butadiene, piperylene and the like. These compounds may be present in amounts up to say 40% of the total weight of the polymerizable mass, i.e., the 1,3-butadiene plus any copolymerizable monomers, plus any extraneous materials as above discussed. It will be appreciated that the copolymerizable compounds are not to be considered in the light of solvents, since they themselves are undergoing polymerization and are generating heat, rather than helping to abstract heat as a simple diluent solvent would.

The Lithium-Based Catalysts

These may be any compounds wherein one or more lithium atoms are combined with a hydrocarbon component containing up to 40 carbon atoms, and preferably up to 20 carbon atoms, such as hydrocarbon lithiums on the order of alkyl lithiums, aryl lithiums, aralkyl lithiums, aryl lithiums and the like. Examples of such hydrocarbon lithiums are the preferred n-alkyl lithiums such as methyl lithium, ethyl lithium, n-butyl lithium, propyl lithium, n-hexyl lithium, n-dodecyl lithium and n-octadecyl lithium. Examples of other hydrocarbon lithiums are isopropyl lithium, tert-octyllithium, n-decyllithium, phenyllithium, naphthyllithium, 4-butylphenyllithium, p-tolyllithium, 4-phenyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,4-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,4,15-trilithioeicosane, 1,3,5-tri-lithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like. Als there may be employed the complex adducts formed by the reaction of metallic lithium with polynuclear aromatic compounds such as naphthalene, anthracene, chrysene, biphenyl, various alkylated naphthalenes, and the like. Such catalysts will ordinarily be employed in amounts sufficient to provide on the order of 0.1 – 3.0 millimoles of lithium per 100 grams of butadiene in the charge. (One millimole of lithium is taken to be 0.001 gram-atom of active lithium, i.e., lithium in sufficiently reduced state to displace hydrogen from water, exclusive of the lithium halides and other salts which may be present in the catalyst preparation). It will be understood that the cited quantities of catalyst are over and above such quantities of catalyst as are consumed by reaction with moisture or other impurities in the polymerization charge.

The Procedure of the Invention

The procedure of this invention will ordinarily be carried out in equipment of substantial size, say 15 gallons (68 liters) or more, as the difficulty of controlling the reaction becomes acute and the usefulness of the applicants' invention comes into especial importance in such reactors, where the ratio of heat removal surface and/or vapor disengagement space to the mass of the contents is inadequate for temperature control. Usually there will be employed a closed reactor provided with a heating and cooling jacket and having a rotary agitator. Also there will usually be provided an overhead reflux condenser with ample liquid disengagement space to assist in the removal of heat. The 1,3-butadiene, copolymerizable monomers if any, and 1,2-diene are charged, preferably at ambient temperatures such as lower temperatures on the order of 25°C., agitation commenced, and the lithium catalyst added. It will be understood that, in the operation of this invention, the amount of the charge will be sufficient to fill the equipment to levels at which the heat elimination parameters become controlling, say to at least about 35% of the capacity of the reactor. The mixture is then slowly heated up to temperatures in the desired polymerization range, i.e., 90° – 150°F., while carefully observing the heat evolution. After the desired temperature has been achieved, polymerization will already have set in, or will shortly set in, and the temperature of the heat transfer fluid in the reactor jacket, and the reflux rate, will be adjusted to remove heat at such a rate as to keep the reaction temperature within desired bounds. Toward the latter part of the reaction, say at a conversion of about 50%, the temperature will rise nothwithstanding the best efforts at cooling, but due to the presence of the 1,2-butadiene, this rise is self-limiting, and the temperature can be kept down to a moderate peak, say not over 250°F. (121°C.). The cited 50% conversion figure is exemplary only, and the point at which the temperature surge takes place will be retarded or advanced accordingly as the intensity of the measures taken to remove heat are respectively increased or decreased. Increased rate of agitation, lowered jacket temperatures, lower internal pressure in the reactor, lowered temperature of reflux and like measures tend to increase the rate of heat-removal and to retard the temperature surge. In general these measures should be applied with sufficient vigor to keep the temperature down within the aforesaid desired polymerization range until the conversion has reached at least about 35%. At this point, assuming that the 1,2-diene is present in accordance with this invention, it is permissible to allow the temperature to surge; due to the presence of the 1,2-diene, the temperature can be kept down, without resorting to extreme measures, to a moderate peak of say not over 250°F. (121°C.) and in any event not over 400°F. (204°C.). However it is possible, and preferred, to postpone the surge beyond this point as long as conveniently possible, by the application of vigorous cooling measures, because the longer the onset of the peak can be postponed, the more easily and reproducibly it can be contained. It will usually be desirable to hold back the surge until conversion has reached 50%, or even 65%, at which point the surge will take place but will easily be contained. Within the above recommendations, the amount of effort expended in deferring the surge will be a matter of economic and technical judgment, based upon the particular equipment and plant conditions involved. In general, there will be no great advantage in postponing the surge beyond the point at which 75% conversion has taken place. After the peak has subsided, and polymerization has been carried further as far as desired, any excess monomers are vented and the polymer recovered. This may be done by purely mechanical means, or by dissolving the product in a solvent to remove it from the reactor. It will be appreciated that the solvent at this point need not be of especially high purity, since the polymerization reaction, which might be interfered with by impurities, has been completed.

DETAILED DESCRIPTION OF THE PREFERRED EMBODIMENTS

With the foregoing general description in mind, there are given herewith detailed examples of the practice of this invention. All parts and percentages are by weight unless otherwise specified.

The 1,3-butadiene used in the examples had the following specifications.

| 1,3-Butadiene | % |
|---|---|
| Methane | .006 |
| Ethane | .0001 |
| Propylene | .077 |
| Propadiene | .0039 |
| n-Butane | .0058 |
| Butene-1 | .7618 |
| trans Butene-2 | .1241 |
| cis Butene-2 | .0213 |
| Methyl acetylene | <.0020 |
| 1,3-Butadiene | 99.0000 |

EXAMPLE I

| | |
|---|---|
| 1,3-Butadiene | 50 pounds (22.6 kg.) |
| *Technical 1,2-Butadiene | 114 grams |
| n-Butyl lithium solution (in hexane; contains .01 g. carbon-bound lithium per ml.) | 161 ml. |
| **Technical grade containing 1,2-butadiene 26.7% | |
| alpha-acetylenes | 0.8% |
| butenes | balance |

The foregoing recipe provides 1,350 parts by weight of 1,2-butadiene per million parts by weight of 1,3-butadiene and 0.00514 gram of active lithium per 100 grams of 1,3-butadiene.

A 20-gallon autoclave provided with a rotary stirrer, a heat transfer jacket and an overhead reflux condenser was provided for this run. A valve was provided in the line between the condenser and the reactor in order to restrict the rate of vapor removal when desired. Also there was provided an observation port window in the top of the reactor and a pressurized bomb connected to inject isopropanol into the autoclave in case the reaction should get out of control, or to terminate the reaction after completion. The reactor was adjusted to 75°F. (24°C.), evacuated and purged once with 1,3-butadiene vapor, after which the 1,3-butadiene and 1,2-butadiene of the recipe were charged and stirring initiated and continued throughout the run to follow. A small sample of the contents of the reactor was withdrawn and titrated with butyllithium to determine the consumption of butyllithium by impurities in the charge, and a corresponding amount of butyllithium solution (not included in the above recipe) added to the reactor to neutralize the impurities in the charge. Circulation in the jacket and condenser were turned on, and the temperature raised to 80°F. (27°C.), at which time the butyllithium of the recipe was injected. Reaction set in in a short time and the circulation in the jacket and condenser regulated to keep the temperature at or below 100°F. (38°C.) until a periodic analysis showed a conversion of 48%. The reactor contents were observed from time to time through the window to check for dangerous abnormalities.

At about this point the valve in the line to the condenser was partially closed, thereby restricting the heat removal so as to demonstrate in an emphatic manner the effectiveness of the 1,2-butadiene as a reaction-controlling agent. A temperature surge took place, but peaked at 238°F. (115°C.) rather than continuing up to much higher temperatures at which the polymer would be degraded. After the temperature surge had subsided, the isopropanol was injected to kill the reaction, 50 pounds of hexane were charged, and stirring continued to form a flowable cement. The unreacted butadiene was then vented, and the cement dropped from the reactor. A yield of 40 pounds of polybutadiene (DSV = 1.90, no gel) was recovered from the cement. Following is a log of the run.

| Time hours:min. | Temp. °F. | °C. | Pressure (psig.) | Conversion (%) | Remarks |
|---|---|---|---|---|---|
| 0:05 | 80 | 26.7 | | 0.0 | Inject catalyst |
| 0:35 | 90 | 32.2 | 40 | 7.9 | — |
| 1:05 | 104 | 40.0 | 50 | 27.9 | — |
| 1:25 | 107 | 42.0 | 48 | 48.4 | — |
| 1:45 | 125 | 51.5 | 70 | — | Reaction at critical point: Temperature surge begins |
| 1:50 | 185 | 85.0 | 65 | — | — |
| 1:55 | 238 | 115 | — | — | — |
| 2:30 | 120 | 49.0 | — | — | Vented unreacted butadiene: charged 59 lbs. of hexane to form polymer cement for removal |

EXAMPLE II

| | |
|---|---|
| 1,3-Butadiene | 52 lbs. (23.6 kg.) |
| n-Butyllithium solution (in hexane, contains .01 g. | 193 ml. |

-continued carbon-bound lithium per ml.)

The foregoing recipe provides 0.0082 gram of active lithium per 100 grams of 1,3-butadiene. No. 1,2-butadiene is used, the purpose being to show the uncontrollable character of the reaction.

The same equipment was used as in Example I, the reactor was adjusted to 50°F. (10°C.), evacuated and purged with 1,3-butadiene vapor, after which the 1,3-butadiene of the recipe was charged, and stirring initiated and continued throughout the run to follow. The contents were titrated and impurities neutralized as in Example I. The temperature was raised to 95°F. (35°C.) and the butyllithium solution injected. The reaction mass was carefully watched through the reactor window. At the end of about two hours, it was observed that red spots, an indication of severe local overheating, were being formed in the mass, and the isopropanol bomb activated to kill the reaction. Cyclohexane (80 lbs.: 36 kg.) was injected and the temperature raised to 150°F. (66°C.) to fluidize the mass, which was then dropped from the reactor. The product contained heavy quantities of gel and degraded polymer.

EXAMPLE III

| | |
|---|---|
| 1,3-Butadiene | 52 lbs. (23.6 kg.) |
| Technical 1,2-Butadiene (26.7%, as in Example I) | 227 grams |
| n-Butyllithium solution (in hexane; contains .01 g. carbon-bound lithium per ml.) | 89 ml. |

The above recipe provides 2560 parts by weight of 1,2-butadiene per million parts by weight of 1,3-butadiene, and 0.0038 gram of active lithium per 100 grams of 1,3-butadiene.

The equipment of Example I was used, and the reactor was purged, charged with the 1,3-butadiene and 1,2-butadiene of the recipe, titrated and neutralized as in that Example. The temperature was set for 100°F. (38°C.). At the end of about 4 hours analysis indicated a conversion of 47%, and the temperature was pushed up to 120°F. (49°C.). The reaction peaked up to 140°F. (60°C.) after which the monomers were vented. Cyclohexanone (80 lbs., 36.3 kg.) was then charged and stirring continued to form a flowable cement, which was dropped from the reactor. The polymer recovered had a Mooney $ML_4$ of 50. Following is a log of the run.

| Time hours:min. | Temperature °F. | °C. | Pressure Psig. | Conversion (%) | Remarks |
|---|---|---|---|---|---|
| 0:00 | 100 | 38 | 50 | 0 | Catalyst injected |
| 1:00 | | | | 8.6 | |
| 2:35 | 116 | 46 | 70 | 15.0 | |
| 3:45 | | | | 47.53 | |
| 4:15 | 140 | 60 | 100 | | |
| 4:35 | | | | | Monomers vented |

The polymer had a DSV of 2.19, Mooney ML-4 value of 50, and infrared analysis of 33.9% cis-1,4, 53.4% trans-1,4 and 12% 1,2-structure.

The polybutadiene prepared as above described was evaluated against a commercial lithium-catalyzed polybutadiene polymerized in a solvent system. Both polybutadienes were compounded in accordance with a standard tire tread stock recipe and tested as indicated in Table I. All cures were at 300°F. (149°C.) for periods of time as indicated in Table I. Following are the results of the tests. It will be seen that the polymer of this example was a substantial match for the conventional polymer, notwithstanding the non-solvent system in which it was prepared.

TABLE I

| Test | Control | Product of This Example |
|---|---|---|
| Mooney ML-4 212°F. | 57.5 | 58.5 |
| Mooney Scorch at 265°F. | | |
| $T_1$ | 22 | 17 |
| $T_{10}$ | 40+ | 40 |
| $V_u$ | 22.5 | 23.0 |
| Cepar Rapid Extrusion at 210°F. | | |
| % W/L Ratio | 64.5 | 53.2 |
| Garvey Die Extrusion | | |
| Extrusion Temp. °F. | 240 | 245 |
| Swell Index (g./cm.) | .867 | .692 |
| Extrusion Rate (g./min.) | 93 | 86 |
| Appearance (subjective scale, 1–16) | 16 | 16 |
| Unaged Stress-Strain Properties | | |
| 300% Modulus, psi. | | |
| cured 15' | N/C | N/C |
| cured 23' | 825 | 900 |
| cured 30' | 925 | 950 |
| Tensile Strength, psi. | | |
| cured 15' | N/C | N/C |
| cured 23' | 2328 | 2000 |
| cured 30' | 2225 | 2125 |
| Ultimate Elongation, % | | |
| cured 15' | N/C | N/C |
| cured 23' | 570 | 500 |
| cured 30' | 520 | 505 |
| Aged Stress-Strain Properties 4 Days at 212°F. | | |
| 200% Modulus, psi. | | |
| cured 15' | N/C | 925 |
| cured 23' | 1125 | 1175 |
| cured 30' | 1025 | 1050 |
| Tensile Strength, psi. | | |
| cured 15' | N/C | 1550 |
| cured 23' | 1900 | 1875 |
| cured 30' | 1700 | 1900 |
| Elongation, % | | |
| cured 15' | N/C | 320 |
| cured 23' | 260 | 260 |
| cured 30' | 260 | 260 |
| Hot Ring Tear, Cured 23 Minutes | | |
| psi at 212°F. | 261 | 319 |
| psi at 275°F. | 240 | 265 |
| Firestone Flexometer, Cured 35 Minutes | | |
| % Deflection | 20 | 20 |
| Running Temp. °F. | 300 | 310 |
| Hardness, Cured 35 Minutes | | |
| Shore A at 75°F. | 60 | 58 |
| at 212°F. | 49 | 51 |
| Young's Modulus Index at $10^4$ psi. °C. | | |
| Cured 35 Minutes | <−70 | −70 |
| Standing London Wet Skid Test, Cured 35 Minutes | | |
| Average Scale Reading | 35.0 | 36.0 |
| Index | 80 | 82 |

Likewise, two tires were built with treads made from each of the above stocks, and subjected to driving tests. The tests were terminated at 12,000 miles, due to a break in the sidewall of the tire with a tread of the commercial polybutadiene. At the termination of the test, the wear ratings for the commercial polybutadiene and the polybutadiene of this example were respectively 100 and 89.

EXAMPLE IV

| | |
|---|---|
| 1,3-Butadiene | 52 pounds (23.6 kg.) |
| Technical 1,2-butadiene (29.5% 1,2-butadiene) | 40 g. |
| n-Butyllithium solution | 148 ml. |

(in hexane; contains .01 g. carbon-bound lithium per ml.)

The above recipe provides 500 parts by weight of 1,2-butadiene per million parts of 1,3-butadiene, and 0.0063 gram of active lithium per 100 grams of 1,3-butadiene.

The procedure and equipment of Example 1 were used, down to the neutralization of impurities. The temperature was adjusted to 87°F. (31°C.) and the butyllithium injected. The reaction proceeded uneventfully for approximately 6 hours. At that time a temperature surge set in. However, by cooling and venting it was possible to limit the peak temperature to 120°F. (49°C.). The polymer was dissolved and recovered as in the preceding examples, yielding a polymer having a Mooney viscosity ML-4 of 55. Following is a log of the run.

| Time hrs. min. | Temperature °F. | °C. | Pressure psig. | Conversion (%) | Remarks |
|---|---|---|---|---|---|
| 0:00 | 87 | 30.6 | 42 | — | Inject catalyst |
| 1:00 | 87 | 30.6 | 40 | 8.27 | |
| 1:30 | 87 | 30.6 | 46 | 10.6 | |
| 2:30 | 90 | 32.2 | 40 | 15.0 | |
| 2:50 | 100 | 37.3 | 50 | — | |
| 3:30 | 94 | 34.4 | 40 | 26.6 | |
| 4:15 | — | — | — | 33.0 | |
| 4:45 | 108 | 42.0 | 60 | — | |
| 5:20 | 110 | 43.0 | — | 49.0 | |
| 6:00 | 120 | 49.0 | — | — | |
| 6:35 | 120 | 49.0 | — | — | Monomer vented |

From the foregoing general discussion and detailed specific examples, it will be evident that this invention provides a novel and readily controllable process for the high temperature polymerization of butadiene in bulk in large-scale equipment. The process avoids the complications involved in the use of hydrocarbon diluents for the control of the polymerization reaction, and results in products which have microstructure and molecular weight distribution which are reflected in freedom from cold flow, tensile strength, tear strength, and smooth processing properties in the polymeric product.

We claim:

1. Process of subjecting

| (I) | a polymerization charge substantially free of diluents and consisting essentially of | |
|---|---|---|
| (a) | 1,3-butadiene | 60–100% |
| (b) | compounds copolymerizable with 1,3-butadiene selected from the group consisting of styrene, alpha-alkyl styrenes such as alpha-methyl styrene, ring-alkylated styrenes such as 1-, 2- and 3-methyl and ethyl styrenes, other conjugated diolefins such as isoprene, 2,3-dimethyl-1,3-butadiene, piperylene and the like | 40–0% Based on the weight of (a)+(b)+(c) |
| (c) | inert hydrocarbons together with | 0–10% |
| (d) | a 1,2-diene | 200–3000 parts by weight per million parts by weight of 1,3-butadiene |
| (x) | said 1,2-diene having the formula CH$_2$=C=CH—R wherein R is hydrogen or an alkyl group containing 1–3 carbon atoms | |
| (II) | in a reactor of a capacity of at least 68 liters, the polymerization charge being sufficient in amount to occupy at least about 35% of the capacity of the reactor, and said reactor being provided with a cooling jacket, and rotary agitator and also being provided with an overhead reflux condenser and with liquid disengagement space to assist in removal of heat, the ratio of the surface of said cooling jacket and vapor disengagement space to the mass of the contents being inadequate, in the absence of said 1,2-diene, to curb the temperature surge as specified at (IV) (c) hereinbelow | |
| (III) | in the presence of a lithium hydrocarbon of up to 40 carbons | |
| (IV) | to temperatures initially in the range 27° – 66°C. | |
| (a) | the temperatures being maintained in this range at least until conversion has reached about 35% | |
| (b) | the temperatures thereafter being permitted to undergo a surge | |
| (c) | the presence of the 1,2-diene referred to at (I) (d) acting to curb said surge to a peak not greater than about 204°C. | |
| (V) | whereby to produce polymers of desirable branched microstructure reflected in | |
| (a) | freedom from cold flow | |
| (b) | good tensile strength | |
| (c) | good tear strength and | —in unvulcanized |
| (d) | good processing characteristics | —state |

2. Process according to claim 1 wherein the 1,2-diene is 1,2-butadiene.

3. Process according to claim 2, wherein the 1,2-butadiene is present to the extent of 500 – 2000 parts by weight per million parts by weight of 1,3-butadiene.

4. Process according to claim 3 in which there is zero copolymerizable compound present.

5. Process according to claim 3 in which the copolymerizable compound is styrene.

6. Process according to claim 3 in which the lithium-based catalyst is butyllithium.

7. Process according to claim 5 in which the lithium-based catalyst is butyllithium.

8. Process according to claim 4, wherein the lithium hydrocarbon (III) is n-butyl lithium, the amount of 1,3-butadiene employed is approximately 50 pounds, and the capacity of the reactor is approximately 20 gallons.

* * * * *